(12) United States Patent
Thramann et al.

(10) Patent No.: US 10,230,778 B2
(45) Date of Patent: Mar. 12, 2019

(54) APPARATUS, SYSTEM, AND METHOD FOR INTEGRATING CONTENT AND CONTENT SERVICES

(71) Applicant: Clip Interactive, LLC, Boulder, CO (US)

(72) Inventors: Jeffrey Thramann, Longmont, CO (US); Michael Lawless, Boulder, CO (US); Jeff Osborn, Broomfield, CO (US)

(73) Assignee: Clip Interactive, LLC, Boulder, CO (US)

( * ) Notice: Subject to any disclaimer, the term of this patent is extended or adjusted under 35 U.S.C. 154(b) by 0 days.

(21) Appl. No.: 15/347,272

(22) Filed: Nov. 9, 2016

(65) Prior Publication Data

US 2017/0126764 A1   May 4, 2017

Related U.S. Application Data

(63) Continuation of application No. 13/842,599, filed on Mar. 15, 2013, now abandoned.

(60) Provisional application No. 61/773,066, filed on Mar. 5, 2013.

(51) Int. Cl.
| | |
|---|---|
| *G06F 17/30* | (2006.01) |
| *H04L 29/06* | (2006.01) |
| *H04H 60/46* | (2008.01) |
| *H04L 29/08* | (2006.01) |

(52) U.S. Cl.
CPC .... *H04L 65/4076* (2013.01); *G06F 17/30029* (2013.01); *G06F 17/30038* (2013.01); *G06F 17/30053* (2013.01); *G06F 17/30867* (2013.01); *H04H 60/46* (2013.01); *H04L 67/1097* (2013.01)

(58) Field of Classification Search
USPC ........ 707/608, 687, 705, 790, 813, 821, 899
See application file for complete search history.

(56) References Cited

U.S. PATENT DOCUMENTS

| | | | |
|---|---|---|---|
| 5,809,085 | A | 9/1998 | Goodson et al. |
| 8,321,534 | B1 | 11/2012 | Roskind et al. |
| 2005/0053020 | A1 | 3/2005 | Thirumoorthy et al. |
| 2005/0182792 | A1 | 8/2005 | Israel |
| 2005/0219068 | A1 | 10/2005 | Jones et al. |
| 2006/0155399 | A1 | 7/2006 | Ward et al. |
| 2007/0022867 | A1 | 2/2007 | Yamashita |

(Continued)

OTHER PUBLICATIONS

International Search Report and Written Opinion for International Application No. PCT/US2014/047475 dated Nov. 25, 2014.

(Continued)

*Primary Examiner* — Sana A Al-Hasemi
(74) *Attorney, Agent, or Firm* — Perkins Coie LLP

(57) ABSTRACT

A system and method for providing seamless consumption of media content and managing playlists for seamless consumption of media is described. One embodiment includes receiving a request for media content; determining a mode of consumption for the media content; determining a media content service to provide the media content; and providing the media content according to the preferred mode of consumption and from the preferred service and managing playlists to integrate reproduction of media content from multiple services.

20 Claims, 8 Drawing Sheets

(56) References Cited

U.S. PATENT DOCUMENTS

| | | | |
|---|---|---|---|
| 2007/0149116 A1* | 6/2007 | White | G06Q 30/0267 |
| | | | 455/3.06 |
| 2008/0092181 A1 | 4/2008 | Britt | |
| 2008/0294548 A1 | 11/2008 | Fowler et al. | |
| 2010/0134278 A1 | 6/2010 | Srinivasan et al. | |
| 2011/0125508 A1 | 5/2011 | Kelly et al. | |
| 2011/0138020 A1 | 6/2011 | Pantos et al. | |
| 2011/0173208 A1 | 7/2011 | Vogel et al. | |
| 2012/0010996 A1 | 1/2012 | Horvitz et al. | |
| 2012/0023131 A1 | 1/2012 | Downey et al. | |
| 2012/0036034 A1 | 2/2012 | Mullen et al. | |
| 2012/0215684 A1* | 8/2012 | Kidron | G06F 17/30867 |
| | | | 705/39 |
| 2012/0245995 A1 | 9/2012 | Chawla et al. | |
| 2013/0151241 A1 | 6/2013 | Park et al. | |

OTHER PUBLICATIONS

U.S. Office Action dated Jul. 23, 2015 for U.S. Appl. No. 13/660,733.
U.S. Office Action dated Oct. 23, 2014 for U.S. Appl. No. 13/660,733.
International Search Report and Written Opinion for International Application No. PCT/US2014/19920 dated Jul. 17, 2014.

* cited by examiner

APPARATUS, SYSTEM, AND METHOD FOR INTEGRATING CONTENT AND CONTENT SERVICES

CROSS REFERENCE TO RELATED APPLICATIONS

The present application claims priority from to commonly owned and assigned application No. 61/773,066, entitled Apparatus, System, and Method for Integrating Content and Content Services, and is related to commonly owned and assigned application Ser. No. 13/660,733, entitled Apparatus, System, and method for Digital Audio Services (the '733 application"), the disclosure of each of which is incorporated herein by reference in entirety for all purposes.

FIELD

Disclosed embodiments relate to managing a media playlist and providing seamless consumption of media. In particular, but not by way of limitation, disclosed embodiments relate to systems and methods for managing a media playlist and providing seamless consumption of media using portable media devices and content streaming, provisioning, and storage services.

BACKGROUND

Media content services like Pandora, Spotify, and Amazon give consumers access to copyrighted works. One reason consumers use those content services is to avoid the cost of owning content. But content services likely will always have holes in what they offer and likely will have trouble incorporating, into their services, all the ways consumers discover and then consume content. For example, discovery engines, like YouTube, generally are "siloed" with no connection to a streaming service, such as Spotify. In other words, no one tracks content that a consumer listens to or views on one service and then serves that content or like content on another service.

Most consumers discover new content, not through a content service, but through traditional discovery engines. And in using those traditional discovery engines, the consumer is passive for the most part. For example, consumers generally discover new music through passive listening of radio and then turn to content services for on-demand access to the new music. So, in general, listeners consume music from two sources: free sources and content services, which are paid-for sources. Some free sources, like radio, allow for passive discovery. Other sources do not—consumers must select content themselves to some greater extent.

Streaming services, a type of paid-for content service, can be referred to generally as, access providers because some allow limited downloads of content. This differs from traditional ownership because although the song is downloaded and is actually present on a particular device local to the user, the user does not own the file containing song or other media. The media file is, in some sense, transitory. The user may not be able to move the media file to another device, the user cannot backup the song, the user does not have a license for unlimited use of the song. In other words, the media and its state is controlled by the service.

Most consumers will never gravitate to one streaming service at the expense of all others. Rather, most consumers will probably combine a service with multiple other discovery engines. For example, music consumers likely will combine some music streaming service with multiple other music discovery engines like broadcast radio, satellite radio, internet radio, YouTube, and the like.

With streaming services, the consumer crafts playlists that include music that consumers have selected themselves and, to a lesser extent, music that the service has deemed acceptable to the listener by virtue of the genome of the listener-selected music. By and large, however, the listener selects that music. Indeed, even the music selected by the streaming service using genomic devices is likely already known to, and may be owned by, the listener. This access model is like renting the music—the listener pays for the ability to listen to music on-demand, but does not have rights to keep it. The listener can either pay-per-listen or pay a flat, periodic rate. The streaming service maintains the playlist and manages "radio" based on the listeners selections—all of the content is provided directly by the streaming service.

Streaming services do advertise an ability to "discover" new media content. But this type of discovery is not the same as the passive type of discovery that happens when someone listens to the radio. On the radio, a DJ or even a computer selects the music to play and presents it to the listener. The listener literally does nothing other than turn on the radio or computer, tune in, and listen. The listener has no control other than turning on and off the station. When streaming services use the term "discover," what they really mean is allowing a customer to textually or contextually search for media content. It is not a passive experience and, hence, is not true discovery.

Another paid-for source are white-label services, branded download services, or brick-and-mortar record stores. By obtaining music from these sources, the listener owns the music—the listener obtains their personal copy and stores it somewhere, either virtually by storing an electronic file or in reality by, for example, putting a vinyl LP on a shelf. Again, these paid-for sources largely require the listener to select, on his own, the music to obtain. There is no spontaneous discovery available other than random search and select.

Although media sources can be classified as either free or paid-for, any media source will usually involve some sort of royalty payment for consumption of media content. With the ownership model, royalties generally are paid out of the purchase price of the content. Streaming services, on the other hand, can be considered pay-per-consumption. Pay-per consumption refers simply to how artists, publishers, record labels, etc. are compensated via royalties for the consumption of works. In some models, the royalties are paid from advertising distributed by the consumption source. For example, a music streaming service will post ads on an application or web page interface or stream an add In those instances, the service has control over whether the ad is presented. In a traditional broadcast medium, royalties are paid in much the same way. The difference between traditional broadcast media and streaming service, is that a traditional broadcaster exercises complete control over the content presented whereas streaming services offer an array of content for the user to consume. And for some streaming services in particular, the user can control the content consumed through playlists. In other models, users pay subscription fees from which royalties are paid. Typically, consumers are not subjected to ads if they are paid subscribers.

To hear new media content on demand that a consumer has discovered via some free source or through some source where the consumer is passive, the consumer must go to some other source to request, either through access or through ownership, the media content. And the consumer is left to manage all of the potential sources of media content and must resort to using multiple services to consume media. This is particularly true for listeners of music.

The result of the current modes of discovering, searching for, requesting, obtaining, and listening to music is that consumers must use several different sources and typically have multiple playlists of music that overlay each individual source. Again, each source is "siloed" such that the listener lacks the capability to enjoy music from multiple sources.

And these problems are exacerbated, particularly for music, because some streaming services have exclusive rights to music or particular artists. If a listener is not a subscriber of the exclusive streamer, this effectively limits the universe of access for the listener to ownership. If the listener prefers the access model and consumes most music that way, the listener effectively lacks access to the music.

Although present devices are functional, they are not sufficiently functional or otherwise satisfactory. Accordingly, a system and method are needed to address the shortfalls of present technology and to provide other new and innovative features.

SUMMARY

Exemplary embodiments are shown in the drawings and are summarized below. These and other embodiments are more fully described in the Detailed Description section. It is to be understood, however, that there is no intention to be limited to the forms described in this Summary of the Invention or in the Detailed Description. One skilled in the art can recognize that there are numerous modifications, equivalents and alternative constructions that fall within the spirit and scope of the inventions as expressed in the claims.

Disclosed embodiments can provide a system and method for providing seamless consumption of media content and managing playlists for seamless consumption of media. One exemplary embodiment includes a method for providing alternative modes of consumption of media that includes receiving, at a central computer server, a request for media content; querying a user preferences database maintained on a first data storage device associated with the central computer system for a mode of consumption preference for a user; determining, based at least in part on the mode of consumption preference, a mode of consumption for the media content; determining a media content service to provide the media content; performing the following: in response to determining an ownership mode of consumption for the media content, sending, to a provisioning computer server of the media content service, a first set of one or more instructions comprising one or more instructions to send, to a second data storage device, a downloadable media content file encoded with the media content; and in response to the determining an access mode of consumption, sending a second set of one or more instructions to add a first reference to a streamable media content file encoded with the media content to a playlist database.

Another exemplary embodiment include a system for providing modes of consumption of media that includes a first data storage device comprising a user preferences database for storing a user preference for a mode of consumption, the mode of consumption selected from the group consisting of ownership and access; and a first computer server comprising a network communications interface, a memory, and a processor, the first computer server configured to receive a request for media content via the networks communications interface, the first computer server configured to query the user preferences database for a user preference for a mode of consumption, the first computer server configured to query one or more second computer servers of one or more media content services for availability data of the media content, the first computer server configured to determine, based at least in part on a mode of consumption of media content and the availability data, a media content service to provide the media content, the first computer server configured to construct a first set of one or more instructions to a computer server of the media content service to provide the media content to send, to a second data storage device, a downloadable media content file encoded with the media content, and the first computer server configured to construct a second set of one or more instructions to add a first reference to a streamable media content file encoded with the media content to a playlist database.

Disclosed embodiments are related to tools for discovering and accessing content using tools that allows consumers to enjoy the benefits of owning the content without necessarily requiring dedicated storage and to enjoy the benefits of accessing content without the limitations of relying on service providers for access. The disclosed embodiments provide a seamless content discovery, ownership, and access experience for consumers. A consumer can tag content and then, using embodiments, have the option of downloading the content or receive the ability to stream the content without receiving a download as well as integrating the content into existing virtual or actual content repositories.

Disclosed embodiments can track content from a discovery engine or other environment that is tagged by a consumer. Disclosed embodiments can also track content (e.g., listen to music) that the consumer streams from a service (e.g., YouTube, Pandora, and the like), that the consumer has already downloaded, or both. Using the disclosed embodiments, existing content streaming services can also be extended and improved by providing a seamless content experience for consumers.

A consumer can be any listener, viewer, or other type of user of copyrightable work or media content. A consumer device can be any portable or non-portable consumption device to which copyrightable content is downloaded or streamed or from which the copyrightable content is consumed. A consumer device can be smartphone, tablet, laptop, desktop, or other computing device. Content can be audio such as music, audio books, etc.; electronic books; video; or other copyrightable work. A media content service, content service, or content streaming service can be any service that provides copyrightable works or media content to consumers.

Benefits of the disclosed embodiments include allowing a consumer to download any broadcast content (e.g., music heard over the radio) for free thus eliminating financial barriers to content ownership and adds impulsivity to content consumption (i.e., discovery of music) and linking content services to discovery engines to the benefit of content services. Disclosed embodiments provide for tracking consumers, their information, and the content they consume. This information can be shared with third parties to enhance the relationships between users and the third parties. For example, artists and record labels can further develop the relationships between artists and their fans. For other copyrightable works, creators, producers, and content providers can further develop relationships with content consumers.

Disclosed embodiments allow a consumer to integrate owned content with content the consumer does not own, but accesses from some content service. Disclosed embodiments also allow a content service to provide a broader spectrum of content by integrating content it normally provides with content it does not normally provide. Furthermore, disclosed embodiments allow content services, and the content producers (e.g., artists, record labels, broadcasters, etc.) to receive information about consumer demand for and consumption of content not provided by the content services, either because the content is new or the content is otherwise unavailable to the content service.

As previously stated, the above-described embodiments and implementations are for illustration purposes only. Numerous other embodiments, implementations, and details are easily recognized by those of skill in the art from the following descriptions and claims.

BRIEF DESCRIPTION OF THE DRAWINGS

Various objects and advantages and a more complete understanding of the disclosed embodiments are apparent and more readily appreciated by reference to the following Detailed Description and to the appended claims when taken in conjunction with the accompanying Drawings wherein:

DETAILED DESCRIPTION

Figure 1:
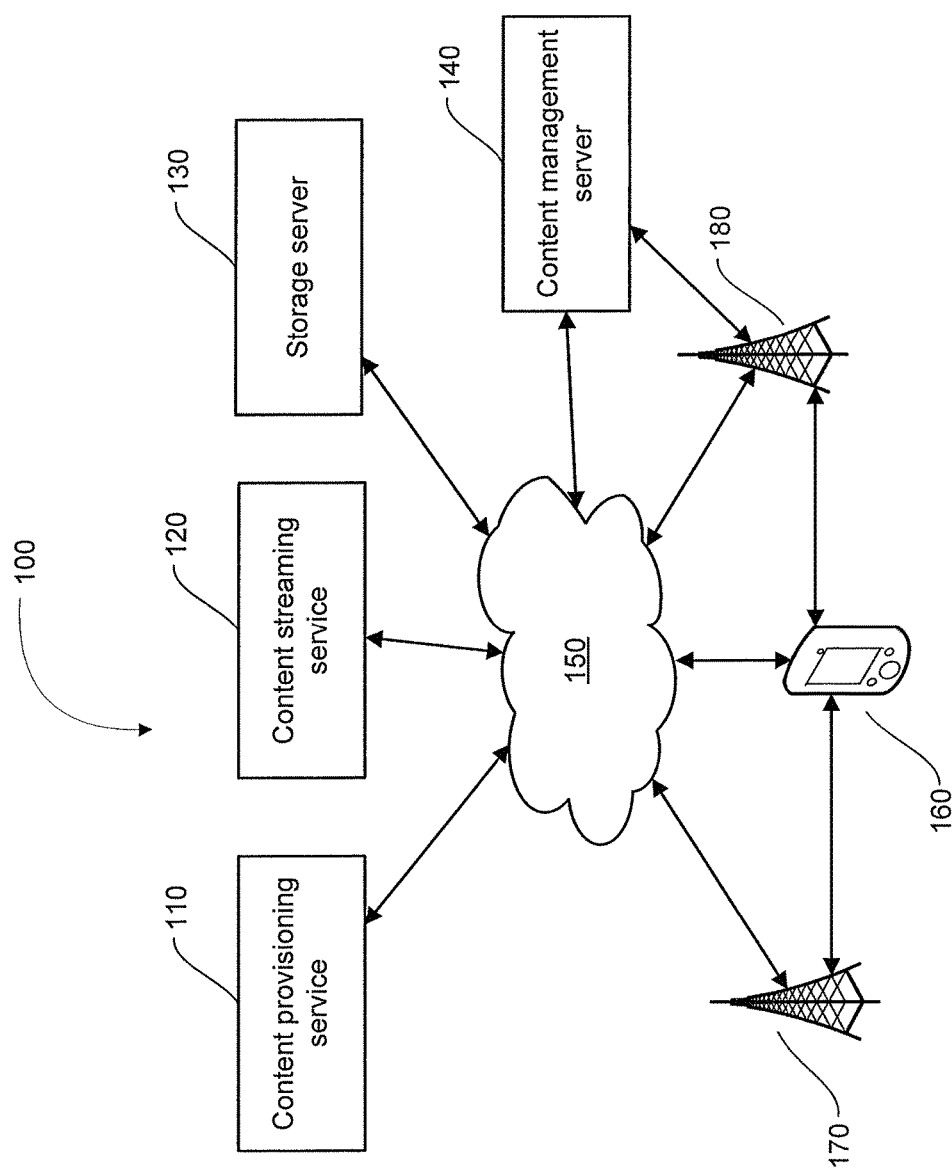
FIG. 1 illustrates a schematic block diagram of a system that allows for the seamless management and consumption of media content according to some embodiments.

In referring to the drawings, like or similar elements are designated with identical reference numerals throughout the several views. FIG. 1 illustrates a schematic block diagram of a system 100 that allows for the seamless management and consumption of media content according to some embodiments. System 100 includes a consumer device 160 for the reproduction (i.e., display, play, etc.) of content. Consumer device 160 can receive content from the internet 150 and can receive and transmit data to the internet 150 either through wired or wireless connectivity. Consumer device 160 can be a mobile phone that receives network traffic from the internet 150 via a wired or wireless network communications adapter, via a radio transceiver over a wireless telephone network 170. Consumer device 160 can also include a radio receiver for the reception of broadcast media from a radio source 180, for playing on the consumer device 160. Other broadcast sources are contemplated, including television. As described further below, in some embodiments, other types of media content can be received by consumer device 160. Furthermore, some embodiments can be used with other types of consumer devices, including computers (e.g., laptop computers, tablet computer, desktop computers) and other devices with computing capabilities.

Those of skill in the art can appreciate the different types of consumer devices that can send network traffic data, receive network traffic data, or both and that be used with disclosed embodiments.

In some embodiments, consumer device 160 can be used to reproduce streamed media content such as audio, video, images, text-based media, and the like. In some embodiments, consumer device 160 can be used to download and store media content for consumption. Such media content can include audio, video, images, electronic books, and the like.

Content provisioning service 110 can be a non-branded source (i.e., white label service) for consumers to obtain ownership of content, usually through a purchase. Examples of content provisioning services 110 include MediaNet and 7Digital, which provide electronic music files. Some embodiments can work with other branded or non-branded sources like iTunes or Amazon. Content streaming service 120 can be any media content source that provides access to content for consumers for streaming purposes. Examples of content streaming services 120 that provide access to music include Pandora, Spotify, and Beats. Examples of content streaming services 120 that provide access to other types of media include YouTube, Hulu, and Veoh. Streaming services 120 can be branded or non-branded and offer media content for free, for a fee, or for other consideration (e.g., agreement to accept advertisements). Storage service 130 can be any third-party service that allows consumers to store media content files and other types of electronic files. Examples of storage services 130 include DropBox and Amazon Cloud Player. Some embodiments can include other services or storage devices that either provide or store media content.

Those of skill in the art can appreciate that media content files can come in many different formats. For audio media, the format of content files can be aac, au, m4a, m4p, mp3, wav, wma, and the like. For video, the format of content files can be .flv, .avi, .mov, .mp4, .wmv, .asf, and the like. For electronic books, the format of content files can be KF8, AZW, EPUB, XML, PDF, and the like. The lists of file formats is meant to be illustrative and should not be considered limiting. In short, whether media is streamed or downloaded, the format of content files can be proprietary or non-proprietary, and content files can be compressed or uncompressed. Some embodiments can be agnostic as to the format of the content.

Content management server 140 manages access by consumer device 160 to the content from services 110-130. Details of how content management server 140 manages access are further described below. Content management server 140 can also receive feeds from broadcasters available to consumers. Consumers can tag content they have heard, viewed, etc. or that is received by a consumer device 160 from a broadcaster. As is further described below, content management server 140 can provide further access to or ownership of media content. As described in the '733 application, content management server 140 can communicate with consumer device 160 and broadcasters 180.

Figure 2:
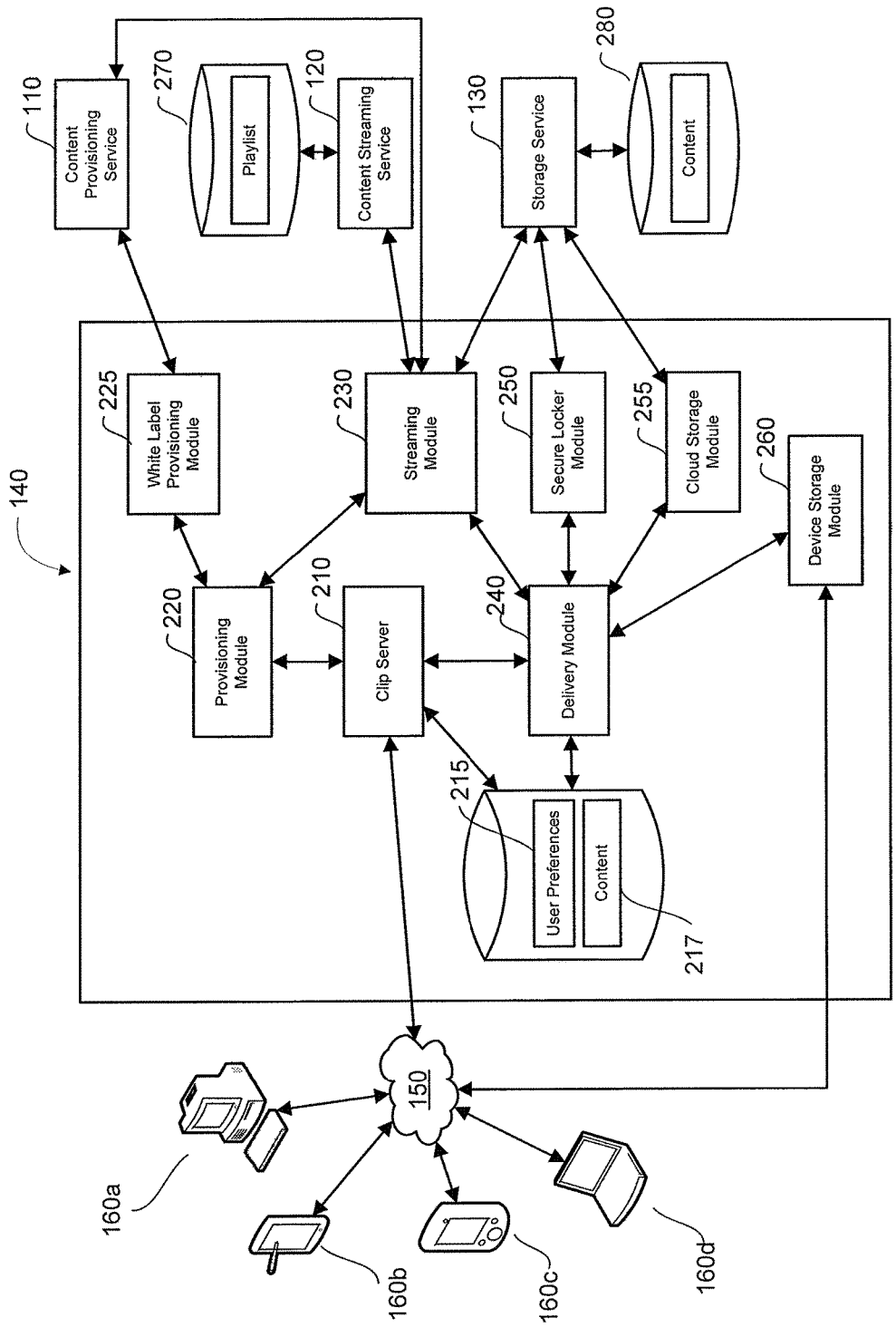
FIG. 2 illustrates a detailed schematic block diagram that includes content management server according to some embodiments.

FIG. 2 illustrates a detailed schematic block diagram that includes content management server 140 according to some embodiments. Content management server 140 can be one or more computing devices and data storage devices. Each of the modules shown in FIG. 2 can be implemented as hardware, software, firmware, or any combination of them. Each of the modules can be further combined in fewer hardware, firmware, or software components or further separated into more hardware, firmware, or software components. Systems and methods implementing the disclosed embodiments, including the illustrative embodiment in FIG. 2, can be implemented on a computer equipped with memory, processor, user-interface, storage media devices, and network communications interfaces. The invention also provides a tangible digital storage medium embodying machine-readable instructions executable by a computer, where the instructions implement the method.

Figure 3:
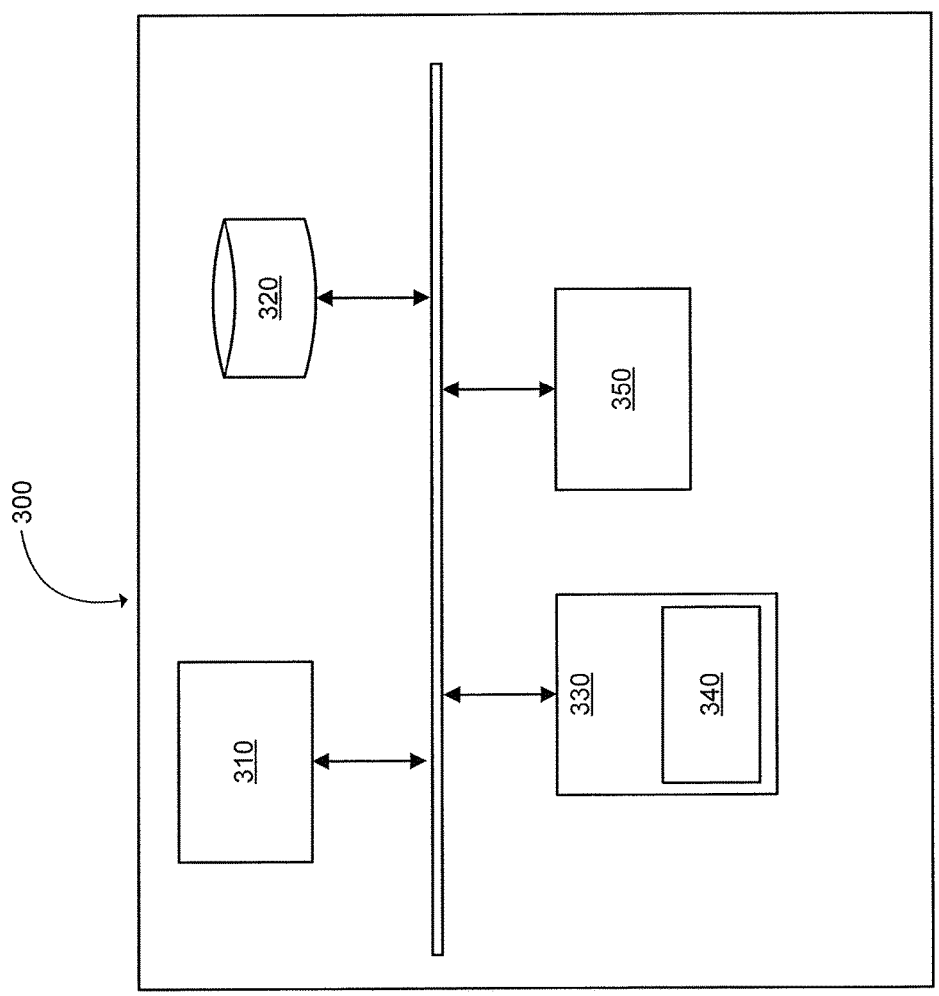
FIG. 3 illustrates an schematic block diagram of specially-programmed computer that can implement one or more of computer system components in accordance with some embodiments.

For example, FIG. 3 illustrates an embodiment of specially-programmed computer 300 that can implement one or more of the foregoing components in accordance with some embodiments. Such a computer 300 can include a network communications interface 310, storage medium 320, memory 330, program instructions 340, and processor 350. Program instructions 340 can be used to implement one or more of the components or portions of components of the system 300. Moreover, in some embodiments, additional hardware components of computer 300 can be included that implement one or more of the components or portions of components of the system 300. The storage medium 320 is can be a hard disk drive, but this is certainly not required, and one of ordinary skill in the art will recognize that other storage media may be utilized with disclosed embodiments. In addition, one of ordinary skill in the art will recognize that the storage medium 320, which is depicted for convenience as a single storage device, may be realized by multiple (e.g., distributed) storage devices.

Returning to FIG. 2, clip server 210 can receive a content tag or information related to content from one of consumer devices 160a-d usable by a consumer in accordance with some embodiments. The clip server 210 can interact with a provisioning module 220 to provide content to the consumer through ownership and a delivery module 240 to provide the content to the consumer through access. Through ownership, the consumer owns a copy of the content and through access, the consumer is granted access without ownership of the content. Ownership usually is accomplished by purchasing content with a single, lump payment; and access usually is accomplished by paying for a single instance of consumption.

The determination of the mode of consumption (i.e., whether to provide content to the consumer through ownership or access) can depend on information about the consumer in a user preference database 215 or other type of data store; information from the consumer or one or more of consumer devices 160a-d; information about the content; information related to some promotion or offer related to the content, information related to the capabilities of services 110-130, which services can provide most cost-effective access, and the like. In some embodiments, the determination can depend on tagging information received from consumer device 160, either separately or in combination with a user preferences database 215.

In some embodiments, a user preferences database 215 can be in data storage device associated with the content management server 140 or with one or more consumer devices 160a-d. In some embodiment a user preferences database 215 can be in multiple data storage devices. In other words, particular user preferences can be stored on particular devices. For example, preferences specific to a consumer device could by in a database on a data storage device associate, with that consumer device. When a consumer tags media content on for example, a phone, the media content could be streamed to the phone based on a user preference specific to the phone. That user preference could be in a database on a storage device local to the phone, centrally located, or located with a third party. The consumer could have a user preference that indicates media content would be downloaded to, for example a table. In that case, the same media content, when tagged from the tablet, could be downloaded. This could be, for example, because the phone has limited disk space, but the tablet does not suffer the same problem.

Moreover, in some embodiments, one or more user preference databases 215 can be made accessible to a consumer through one or more of consumer devices 160a-d. Using the same example from above, in such embodiments, a user preference database can be updated, for example, so that media content can be downloaded the phone, so that media content can be streamed to the tablet, and the like. User preference database 215 can include preferences for how media content is deliver, how media content is obtained, whether media content is referenced in a playlist, how playlists are managed, how media content services are used, and the like.

For example, each media content service 110-130 can have capabilities unique or particular to that media content service. The consumer may subscribe to multiple media content services 110-130 that can provide the media content to the consumer. The consumer may prefer delivery of the media content in a particular way that only one of the media content services 110-130 has the capabilities to provide (e.g., delivery of content in a particular format, delivery to a particular device, etc.). In that instance, that particular service with the particular service capabilities can be used to provide the content.

Moreover, a media content service can have limited capabilities that prevent a particular type of media content delivery requiring that provision of media content be accomplished through a different media content service. For example, a particular content streaming service may prevent access of media content on a particular type of device. In that case, a different content streaming service or a content provisioning service can be used to stream or download the media content requested by the consumer.

The provisioning module 220 can be used to establish ownership rights to content. Ownership rights can be implemented through downloading content or providing ongoing access to it. A white label provisioning module 225 and streaming module 230 can be used to implement ownership download or access from one or more external or internal media content services 110-130; devices, including one or more consumer devices 160a-d; or storage services 130. The white label services module 225 can be used to retrieve content for storage for a consumer. For example, clip server 210 can receive a content tag indicating that a consumer tagged a song and has chosen to download it. In some embodiments, clip server 210 can retrieve user preferences for the consumer from the user preferences database 215, which indicates that the consumer prefers to download music to a mobile device 160c from a particular content provisioning service 110 that is a white label service (i.e., a non-branded provider of access to content). In some embodiments, the provisioning module 220 can retrieve user preferences for the consumer from the user preferences database 215. The provisioning module 220 can instruct the white label services module 225 to retrieve a media content file encoded with the song (e.g., mp3 file) from the particular white label service. The provisioning module 220, the white label services module 225, or some other module can then direct the media content file to the consumer's mobile device 160c. In some embodiments, a representation of the content can be included on one or more of consumer devices 160a-d while the actual content is stored elsewhere, either externally or internally.

The streaming module 230 can be used to interact with one or more of content streaming services 120, storage services 130, or other services or internal or external storage to provide ongoing access to content for a consumer as if the consumer had downloaded the content to a particular device. This can be accomplished by instructing one or more of the media content services 120-130 that provides access that the consumer has obtained ownership rights to content so that one or more of the media content services 120-130 that provides access provides ongoing access to the content for the consumer without restriction or interruption normally reserved for consumers who lack ownership of the content or with reduced restriction or interruption. The content can be stored internally or externally, in a database associated with one or more of the consumer devices 160*a-d*, with the content management server 140, or with one or more of the media content services 110-130. In some embodiments, the streaming module 230 can be used to add information about the consumer's ownership of the content to one or more playlists maintained or used by the consumer. A playlist can likewise be stored internally or externally, in a database associated with a consumer device 160*a-d*, with the content management server 140, or with one or more of the media content services 110-130.

Figure 4:
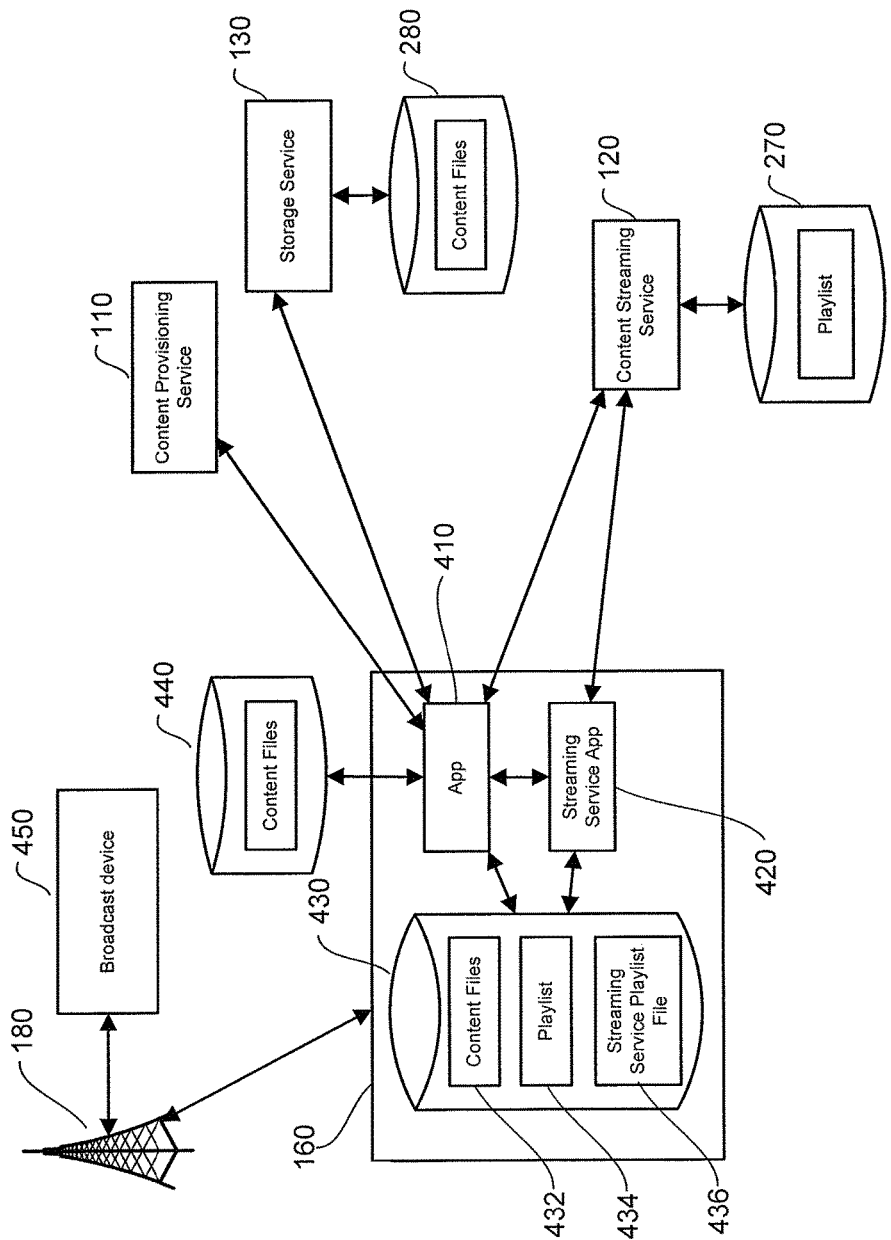
FIG. 4 illustrates a schematic block diagram that includes a consumer device specially programmed with an application that communicates with media content services.

In some embodiments, content media files can be stored in a database associated with one or more of the consumer devices 160*a-d*, associated with the content management server 140, or associated with one or more of the media content services 110-130. A database can be associated with a server or service if it is accessible to the server or service and can be local or remote to the server or service. For example, databases 215, 217 are associated with content management server 140; data storage devices 430, 440 depicted in FIG. 4 are associated with consumer device 160*c*; database 270 is associated with content streaming service 270; and database 280 is associated with storage service 130.

Content provisioning service 110 can be any service, as described above, that provides ownership of media to consumers. Content streaming service 120 can be any service, as described above, that provides access of media to consumers and can include subscription-based services or any other source that can provide media on demand. Content streaming service 120 can have an associated database 270 in which consumer playlists are stored, media content files are stored, or both. Storage service 130 can be any service, as described above, that provides internet, or cloud, storage of media for consumers. Storage service 130 can have an associated database 280 in which media content files are stored, including media content files owned by consumers. In some embodiments, database 280 can also store consumer playlists.

Delivery module 240 can be used to establish access rights to content for the consumer. Access can be implemented by sending an instruction to a media content service that a consumer is allowed to consume content (e.g., listen to a song, watch a video, read a book, etc.). Streaming module 230 can be used in the same way described above in connection with the provisioning module 220 and to communicate with streaming services 120 and storage services 130 to establish streaming capabilities for a consumer and one or more of a consumer's devices 160*a-d*. Device storage services module 260 can be used to store a media content file or a representation of content in either an internal or external storage device associated with one or more of consumer devices 160*a-d* or with content management server 140, such as content database 217 for integration in a playlist or otherwise. The cloud storage module 255 can be used similarly for use with proprietary or non-proprietary third-party storage services.

The streaming module 230 can be used to instruct internal or third-party external content streaming services 120 to stream content to one or more of consumer devices 160*a-d* or to otherwise control streaming or access of content for a consumer on one or more consumer devices 160*a-d* that has rights to stream or access the content. The streaming module 230 can also record representations of content that can be used to indicate to an internal or external content streaming service 120 that a consumer or consumer device has rights to stream the content. The representations of content can be recorded in a database on an internal or external data storage device. Secure locker module 250 can be used to instruct a storage service 130 that is a proprietary third-party storage service that a consumer or consumer device has rights to access content stored in a secure locker.

It should be understood that the modules of the content management server 140 depicted in FIG. 2 can be further combined or separated or organized differently. Those of skill in the art can appreciate that other embodiments can include different module organizations and combinations.

FIG. 4 illustrates one embodiment that includes a consumer device 160 specially programmed with application 410 that communicates with services 110-130. Application 410 can manage media content from the services 110-130 similar to content management server 140. Consumer device 160 can also receive broadcast signals from radio broadcast sources 180 either through an internet feed or a radio signal. Application 410 can be used to tag content received from such broadcast signals. In some embodiments, application 410 can be used to tag content that is transmitted to a broadcast device 450, such as radio, television, satellite radio, and the like. Various embodiments of methods and systems for receiving and tagging broadcast and other media content is more fully described in the '733 application.

Application 410 can also be used to tag media content from other sources. For example, images of objects or objects themselves can be tagged. For example, the image of a book on a browser on the consumer device 160 or some other computing device can be tagged. This can be accomplished by taking a picture of the object, scanning a bar code, QR code, or some other type of code associated with the object, taking a picture of a browser window, selecting the image in a browser, reading a RF tag associated with the object, scanning the object or an image of the object, and the like. Those of skill in the art can appreciate that identifying information associated with an object can be collected in various ways. Tagging an object can be accomplished using the application 410 or by collecting information associated with the object outside of the application 410 and using the application 410 to retrieve the information.

Application 410 can also interact with streaming service application 420 by adding the content to the playlist managed through streaming service application 420. In other words, if the user normally would add a reference to content either owned by the user or available via streaming from a streaming service, application 410 can add the reference automatically when the user tags the content. If the content was downloaded, for example, to the consumer device 160, a reference to the media content file on the consumer device 160 can be added. If the media content was made available to the user through a streaming service, a reference to the media content file streamed by the service can be added. In some embodiments, application 410 or content management server 140 can use an application programming interface (API) of the content streaming service 120 or streaming service application 420 to add a reference to the media content file. Such an API can allow an interface with a playlist manager, of the content streaming service. An API for a content provisioning service 110 or content storage service 130 can allow application 410 or content management server 140 to send instructions for managing and retrieving media content files, managing playlists, and communicating with the service. In some embodiments, application 410 or content management server 140 can add a reference to the media content file directly to a playlist database maintained on the consumer device 160, by the content streaming service 120, or at a content storage service 130.

Application 410 can manage a playlist database 434 that references content 432 stored locally on the consumer device 160 or external to the consumer device 160 or maintained or provided by one or more services 110-130. For example, application 410 can manage a playlist that references content stored on a content streaming service 120, a storage service 130 or elsewhere. Current streaming services can only reference content that is either stored on the device to which the content is streamed or owned and stored by the streaming service itself. Some embodiments allow for the reference of content that is owned and managed by third parties. In this way, media content that is provided by disparate services or stored in disparate databases can be accessed via a single playlist or a reduced set of playlists and a consumer device 160 is agnostic about how media content is provided or where media content is stored. It is to be understood that capabilities of application 410 described herein can also be capabilities of one or more modules of content management server 140.

Streaming service application 436 can be an application that serves as an interface to a proprietary streaming service and can serve similar functions to application 410 but is proprietary and provided by content streaming service 120.

Playlist database 434 on consumer device 160 can be proprietary or non-proprietary. It can be created by streaming service application 420, application 410, or through some other application, software, or component of a streaming service application 120 or content management server 140. In some embodiments, a list of files made available by the operating system of consumer device 160 can serve as a playlist database 434. In some embodiments, the download of one of the media content files 432 to the consumer device 160 can have the effect of adding a reference to the media content file to a playlist 434. In some embodiments, a playlist database 434 can reference media content files on a storage device 440 separate from, but connected to, consumer device 160.

Figure 5:
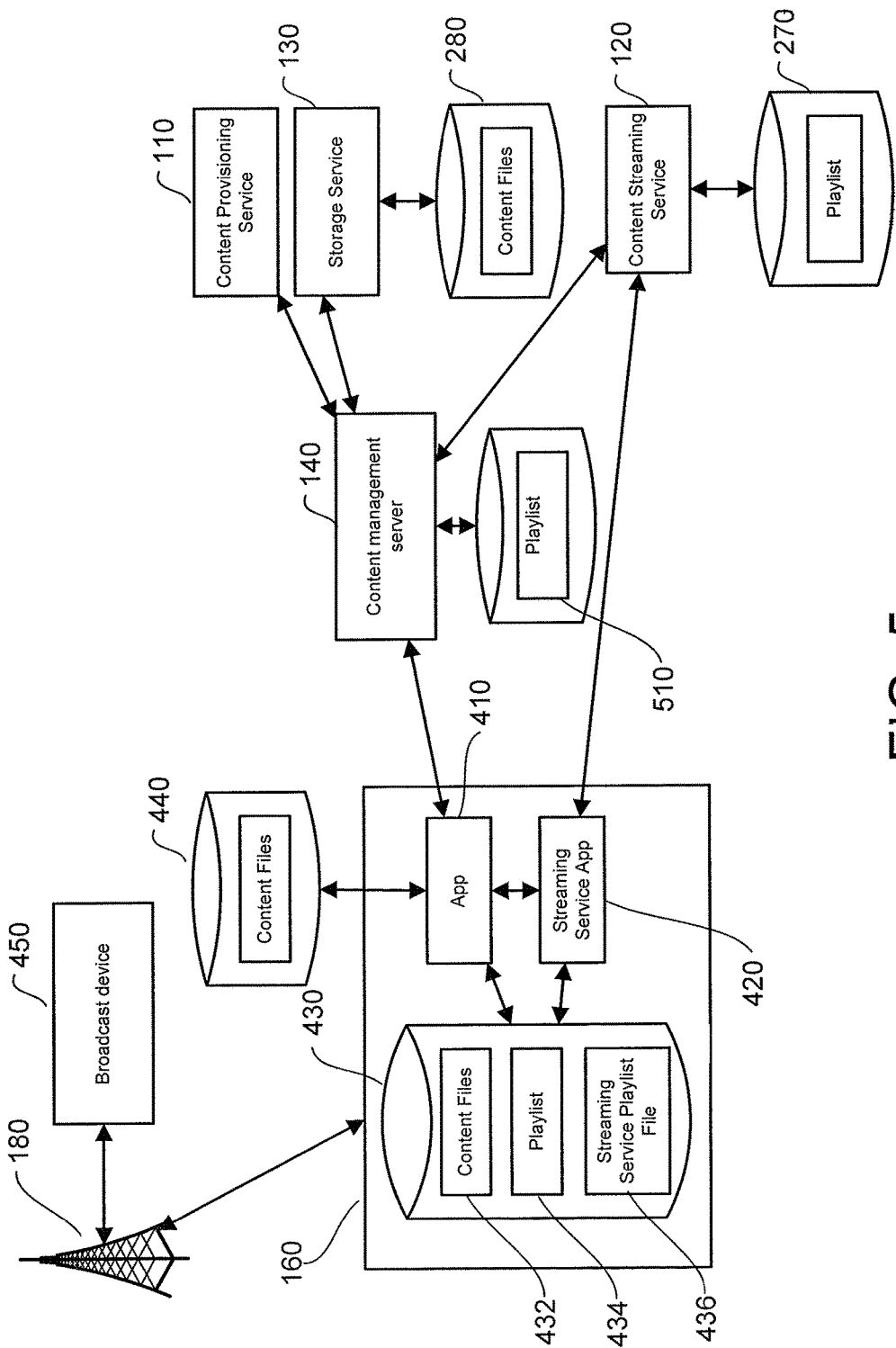
FIG. 5 illustrates a schematic block diagram in which an application interacts with a content management server.

Referring now to FIG. 5, an embodiment is shown in which application 410 interacts with content management server 140 rather than directly with media content services 110-130. In the embodiment shown, application 410 can be used to tag content, interact with streaming services application 420, and interact with media content files 432 and playlist database 434 stored on local data storage devices 430 and with media content files on local data storage device 440. Content management server 140 can be used to interact with media content services 110-130. In some embodiments, content management server 140 can maintain a playlist database 510 that tracks media content files owned by a user, accessible to the user, or both. In some embodiments, content management server 140 can also manage a content database containing media content files owned by a user. Playlist database 510 can include references to media content files stored in a database or data storage device associated with consumer device 160, in a database associated with the content management server 140 or with one or more of the content media services 110-130.

In some embodiments, if a consumer lacks a subscription to a content streaming service, a consumer can still tag a media content (e.g., a song heard over the radio) and, thereby, request the media content file encoded with the media content be downloaded. The consumer might select a tag that includes a download request or a download request can be included in the user preferences database 215 for the user. In other words, the identifying information about the media content can be received from the consumer device 160 by the content management server 140 and the media content file encoded with the song can be sent to the consumer device 160.

If content is not available (e.g., not on a public playlist) on the streaming service, the user can download the song through the content management server 140 or application 410 and that song can then be available to the individual user through a content streaming service 120 or content streaming service application 420. In other words, whether the content streaming service 120 carries the content can be determined and, if it does not, the content can be obtained elsewhere, and sent to the consumer device 160 or centrally cached or stored for the consumer. The content, although it exists outside the content streaming service 120, can be consumed using the content streaming service 120. The content streaming service 120 or some other database can maintain a record of the content as part of the consumer's playlist, queue, or the like on behalf of the consumer. A request from the content streaming service 120 can be received by the consumer device 160, by a storage service 130, or some other service to which the consumer has access to play the media content for the consumer. In some embodiments, the consumer's other content source can be a local data storage device controlled by the consumer or associated with a consumer device 160 or some other data storage device managed by a third party. Media content files encoded with the media content are stored in one of these storage devices. The content, owned by the consumer, can be made available through the content streaming service 120 to just the consumer owner of that media content.

In some embodiments, rather than download media to the consumer device 160 or some other storage location, the consumer can be given access to the media through a streaming service 120 despite the user not having a subscription. In other embodiments, however, identifying information about the content and consumer can be received and passed on to one or more of the media content services 110-130. The content management server 140 or application 410 can indicate that one or more of the media content services 110-130 should provide the content to the consumer or consumer device 160, that the consumer has interest in the content, the consumer prefers the content, and the like. One or more of the media content services 110-130 can then add such information to existing information about the consumer or consumer device 160, the media content, or both.

In some embodiments, the content management server 140 can send an instruction to the content provisioning service 110 to provide a media content file to the storage device of choice on behalf of the consumer and send a transaction record including payment information for the media content. Using such embodiments, the consumer is provided ownership of the content file for free, and royalties are paid on behalf of the consumer. For example, a radio broadcaster can offer ownership of a song as a promotion. A user, hearing a radio ad or the song, can tag the song. In response to receiving the tag information, the content management server 140 or application 410 can query a user preferences database 215 to retrieve the consumer's preferred method of storage, store the clip or other record related to the tagging, in a database, and send a request to a content provisioning service 110 to send a media content file to the preferred method of storage.

A request similar to the request sent to a content provisioning service 110 can be sent to a content streaming service 120 to provide access to the song for the consumer and add a reference to the song's content file or link to one or more of the consumer's playlists. In some embodiments, the content management server 140 can send a transaction record including payment information for a per-play subsidy for the streaming or access cost for the particular content. The content management server 140 can also add a reference to the song's content file or link to one or more of the consumer's playlists.

In other embodiments, the consumer can determine whether the content should be downloaded, regardless of whether the content is available on the content streaming service 120. In other words, a consumer preference for downloading the content or accessing the content through a content streaming service 120 can be received and a determination of whether to download based on that preference can be made, regardless of whether the content is available from a content streaming service 120.

In some embodiments, application 410 can be embedded within content streaming service application 420. Benefits to content streaming service include the ability to deploy market by market or nationally. This embodiment also allows for a single interface point on a consumer device that can be activated when tagging media content. The media content or information about the media content can be added to a list that the consumer can then move to a desired location within whatever consumer device 160 is used. One benefit of such an embodiment is that a consumer is much more inclined to use a content streaming service. Another benefit is that tagging content for any purpose can be centralized at this one interface point. Many content streaming services allow the consumer to tag streamed content and create playlists, queues, etc. within the media content service's environment (i.e., the content streaming service application 410 or interface). The single interface point can be embedded in or laid over the content streaming service application 410 or interface. For example, for music, it results in one button the user can use to say "I like this song," regardless of whether the song is on the radio or in the stream. For the consumer, the method of delivery of media content and follow on access or ownership is seamless without the consumer lacking awareness of the original source of the media content or of the services the consumer uses.

For example, a music streaming service can add a song tagged by the consumer to the consumer's playlist within the music streaming service. As another example, the information can be used to add the content to a "wishlist" or "queue" on a media content service. In another example, a media content service can aggregate the information to make decisions about the content it provides to its customers, including whether to provide the particular content, whether to provide similar content, whether to cease providing certain content, and the like. The information sent to a media content service can be specific to that media content service or type of media content service and can include information specific to influencing any decision made by the media content service.

In some embodiments, a consumer could be listening to the radio, the consumer could tag a song, the consumer could then receive a chit, or clip, in response to tagging the song, and that chit can include an advertisement. In other words, an indication that the consumer tagged the song could be received and a chit would be sent to the consumer device with advertisement information in response. Chits, or clips, their behavior, their contents, and their management are described more fully in the '733 application. A chit, or clip, can contain information about the tagged content, the consumer, advertisements or offers related to the consumer, the tagged content, and/or the source of the tagged content. The clip can include a link to a content streaming service 120 to which the user subscribes. Through the link, the media content of the content streaming service 120 could be searched to determine if it provided the tagged or "clipped" content. If the content streaming service 120 provided the content, the content streaming service 120 could be alerted that the consumer likes the content and the tagged information about the content (not necessarily the downloaded content file itself) would be automatically added to the consumer's favorites list, playlists, etc.

A clip can include the capability to launch a content streaming service application 420 and allow the user to put the tag where they want. In other words, in response to receiving information that a consumer has tagged content, a link to a content streaming service 120, software to launch a content streaming service application 420, or an instruction to launch a content streaming service 420 webpage can be sent to a consumer device 160 so that the consumer can access the content or other, related content (content can be related by virtue of sharing the same artist, label, content category, and the like). For example, a player can be embedded in a clip (and/or be integrated with a consumer device 160 media player or application) to enable the simple tagging of content for access. A consumer can still tag content and still play the content and can do so without having to download the content to a consumer device 160.

One benefit of this is that the consumer is not required to dedicate storage to the ownership of the content. The consumer has already arranged for access to the content thereby minimizing or eliminating disadvantages of ownership.

One benefit of the disclosed embodiments is that the consumer user can use existing and proven music discovery capabilities to improve the content available through their media content service. For example, this can support the "natural economy" of music as it drives people to radio to get the more popular songs not available on the streaming services. Another benefit is that a streaming service can be alerted to the content their customers want but which the service does not supply. This gives the streaming service data that can be used to intelligently prioritize how to fill their content holes. This results in a more complete streaming service. In some embodiments, media content that a consumer tags is provided to the consumer regardless of whether any service makes it available. As the content holes are filled by media content services because they have more intelligence about what users are consuming, the operator of the content management server 140 can give away less free media content to the streaming customers.

In some embodiments, advertising revenue is generated from delivering ads in response to consumers tagging media content. That revenue is used to subsidize free media content for the consumer. As services fill their content holes, the operator of the content management server 140 is able to keep more of that revenue. Moreover, information related to the consumer, and to the potential fan of the media content in particular, can still be identified via the tagging. Consumers are more likely to tag content because they obtain access or ownership of the media content regardless of whether the media is available through their service or not because the consumer pays nothing. As a result, more royalties are paid to the creators of content (e.g., song writers, record labels, etc.).

One benefit to a media content service is that they minimize their content holes and pay no streaming fees when they stream media content downloaded for the consumer via the content management server 140 or application 410. In some embodiments, if the streaming service already has access to media content, the content management server 140 or application 410 will still send a tag to the streaming service but the operator of the content management server 140 can pay the streaming service every time that media content is played via the consumers playlist that references the streaming service for the media content. As a result, as more music is tagged through application 410, the streaming services are able to subsidize royalty fees for streaming content to a greater extent.

In another embodiment, a tagging data can be received from a consumer device 160 and, in response, a stream or other content can be sent to the consumer device 160. For example, the information related to the tagged media content received from a consumer device 160 can be sent to one or more of media content services 110-130. In response, information about one or more of the media content services 110-130 can be sent to the consumer device 160. For example, an offer to register with one or more of the media content services 110-130 can be sent to a consumer device 160 from which the tagging data was received.

Some embodiments leverage radio-driven discovery of music. An ad-sponsorship model that is all driven by on-air radio ads can be used. When a consumer tags content from a radio broadcast, tagging data can be received, recorded, and further information can be added related to the tagging, the consumer, the consumer device, and the like. For example, award points can be recorded for the consumer; rights to share media content (i.e., access of ownership) can be obtained for sharing with other consumers or consumer devices; and the like. Similar models can be implemented using some embodiments for other types of media.

In some embodiments, tagging data can be tracked for a consumer and once a predetermined threshold number of tags for a song, artist, content provider, content type, vendor, marketer, product, service, or the like is accumulated for a consumer, content, an offer, or some benefit in digital form can be sent to the consumer or consumer device, content can be cached for the consumer, consumer subscriber information can be sent to a media content service, and/or the like. For example, a consumer who tags numerous coupons and makes purchases and otherwise engages with a large number of commercial offers might have enough points to buy 10 songs. That is, the consumer obtains awards to own 10 songs. As an alternative, the awards can be redeemed so that that consumer can access 400 streaming plays. Again, similar models can be implemented using some embodiments for other types of media.

Figure 6:
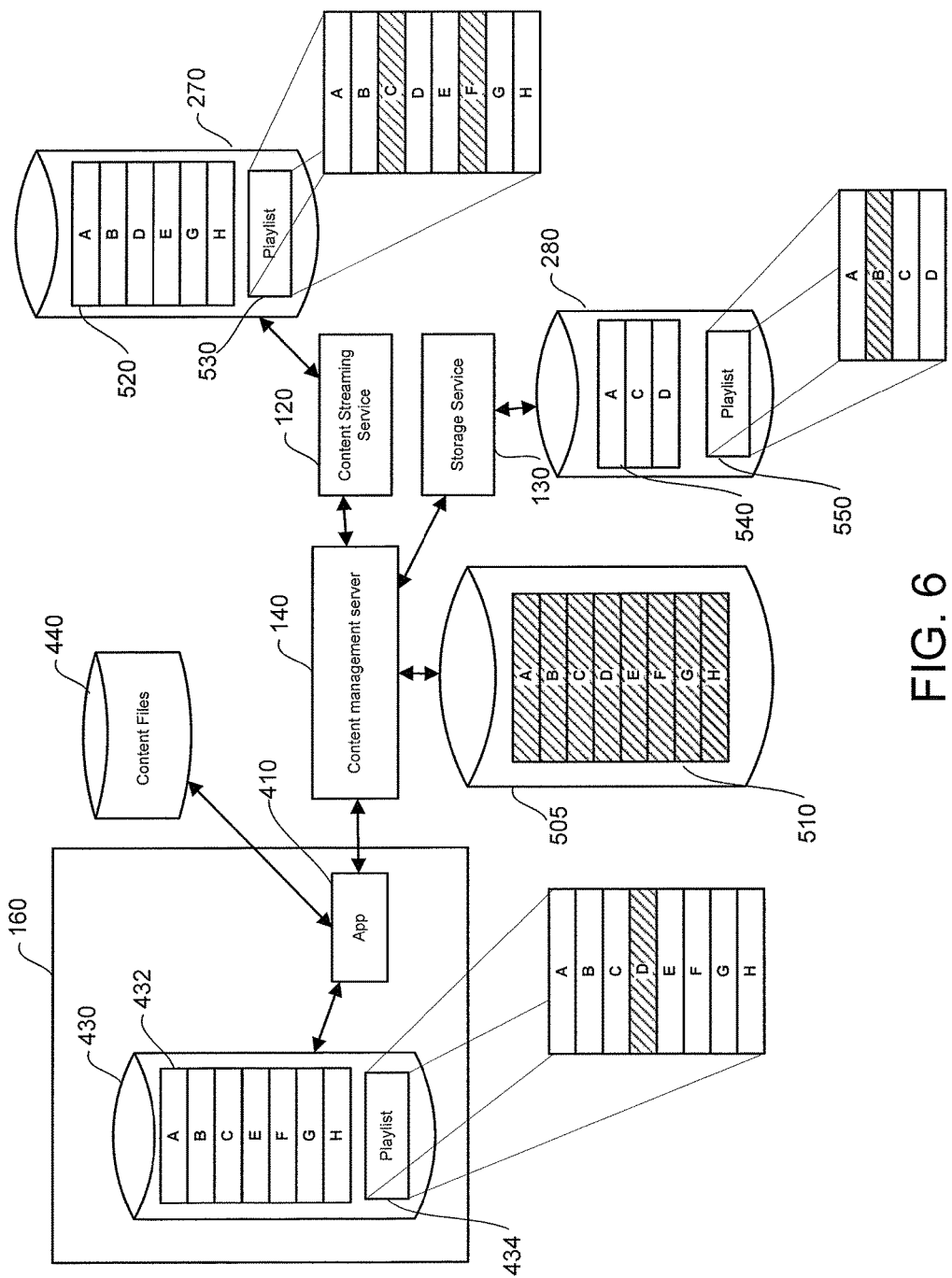
FIG. 6 illustrates a schematic block diagram of playlist management.

Referring now to FIG. 6, a schematic block diagram is shown that illustrates how playlists stored in different databases can interrelate. Data storage device 430 of consumer device 160 can store a playlist 434 that references media content A-H. Data storage device 430 also stores media content files A-C and E-H. Media content file D is not stored on data storage device 430 (indicated by cross-hatching). The playlist item for media content D can reference a media content file on data storage device 440, storage device 280 associated with storage service 130, or storage device 270 associated with content streaming service 120. When a media player on consumer device 160 plays the media content from playlist 434, media content from any of those sources can be referenced and that media content from one of those sources can streamed or downloaded for play.

In some embodiments, a playlist 510 can be stored on a data storage device 505 associated with content management server 140. In some embodiments, playlist 510 can reference media content files stored on data storage devices unrelated to content management server 140. This can serve as backup. In some embodiments, playlist 510 can be used as the operative playlist when playing media on consumer device 160.

A playlist 550 can also be stored on storage device 280 associated with storage service 130 and can be available to application 410 via content management server 140. In some embodiments, application 410 or another application can access playlist 550 for media play on consumer device 160. Playlist 550 can include a reference for media content B, not also stored with media content files 540. The playlist 550 reference for media content B can be for content available through streaming service 120, on data storage device 430, or some other data storage device. When media content B is referenced from data storage device 270 associated with streaming service 120, data storage device 270 is considered a third-party data storage device. In the event that the reference is for media content B available through content streaming service 120, a media player on consumer device would, for example play the media content A on data storage device 280, then stream media content B from content streaming service 120, then play media content C on data storage device 280.

Likewise, a playlist 530 can be stored on a data storage device 270 associated with content streaming service 120. Playlist 530 can reference media content files located on data storage device 270 in content streaming database 520 containing media content files, data storage device 430, and third-party data storage device 280. When the consumer streams a playlist from content streaming service 120, the streaming service can direct a media player to one of the other data storage devices 430, 280 and media content files 432, 540.

In some embodiments, it is, possible to reference any media content file available through any type of media content service or stored on any accessible data storage device. Certain media content services have, capabilities and particular limitations based on their proprietary implementations. Availability of playlists and media content can therefore be limited for particular services. In yet other embodiments, playlists can be embedded. For example, a playlist can reference one or more other playlists and can reference playlists located on other data storage devices. Those of skill in the art can appreciate that referencing media content files stored in databases associated with other services can be accomplished programmatically through interfaces (i.e., APIs) or other available protocols. In some embodiments, a content service playlist can reference media content in third-party data storage devices. That is, media content in the playlist of one service, regardless of where that playlist is stored, can be referenced by pointing to media content managed by another service.

In some embodiments, media content may be unavailable from any service. In that case, the application 410 or content management server 140 can update a playlist with a placeholder. In some embodiments, application 410 or content management server 140 can query media content services 110, 120 for availability at certain intervals (i.e., every day, every week, etc.) or when the consumer runs through the playlist and the media content is set to play had it been available.

In some embodiments, the content management server 140 can become a respected authority for ownership equivalency rights to licensed media content. Application 410, content management server 140, or some other server can request to stream media content from a media content service and have the media content service respect the authority of the content management server 140 to make that request. For example, the content management server 140, can send a request to stream "Space Oddity" from iTunes, which, because the content management server 140 is a respected authority, iTunes agrees to respect and renders the song. In some embodiments, media content services can act as a proxy to provide the authority described above.

In some embodiments, content management server 140 or some other similar server can generally serve as a media content ownership equivalency. This would allow content management server 140 or the other similar server to "authorize" media content as owned by a consumer or other entity and, therefore, playable by other sources, which may require ownership recognition to provide their service. For example, a consumer can purchase a song, like "Space Oddity" by David Bowie, from one media content service, like Amazon. Making this purchase (which involves a digital download), grants the consumer rights to stream that song at any time free of charge from Amazon's cloud. A second media content service, like iTunes, does not recognize that the consumer owns the song through Amazon and therefore does not allow the consumer to stream it in spite of the ownership. The consumer may not have the proper proprietary player for the media content service that does allow the song to be played (i.e., the consumer has iTunes but not an Amazon player).

In some embodiments, content manager server 140 can verify ownership to to the media content service that has not recognized ownership so that the media content can be accessed. In the example above, the consumer would be allowed to stream the iTunes "Space Oddity" song because the content management server can insure that the consumer owns the content or has rights to it.

In some embodiments, content management server 140 can receive a request from a media content service 120, 130 to verify ownership or access rights to media content for a consumer or consumer device 160a-d. The content management server 140 can send a token to a media content service 120, 130 that verifies ownership. In some embodiments, a token can be any record that proves rights authority. In some embodiments, a token can include an identifier for the media content, the consumer, a consumer device, the media content service requesting the token, a media content service from where ownership or access has already been established, security keys or codes, a consumer password, a media content service password, and the like to establish a right. In some embodiments, a token can be established according to some industry standard or proprietary or non-proprietary method or format.

Figure 7:
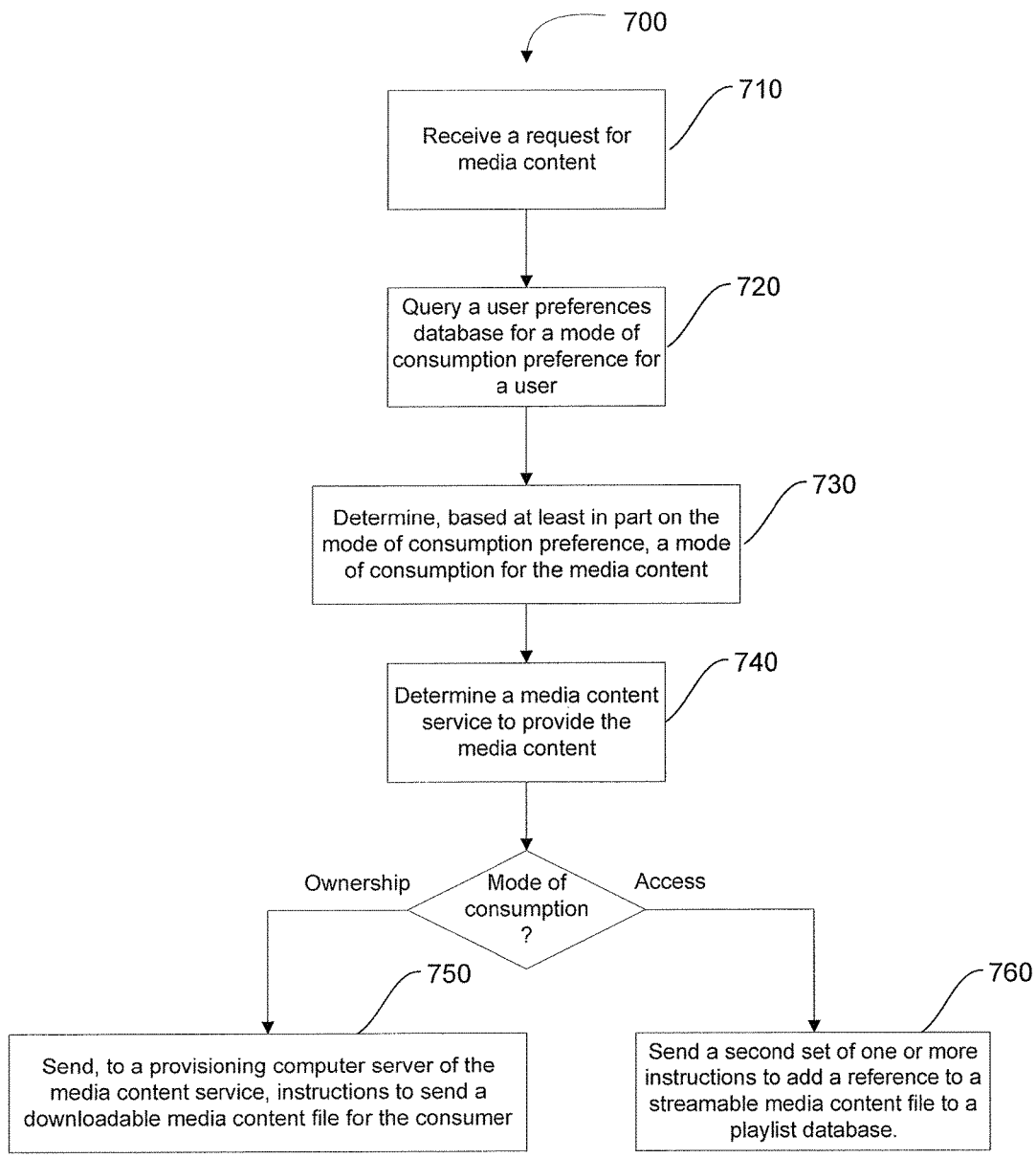
FIG. 7 illustrates a method for seamlessly providing alternative modes of consumption of media.

Referring now to FIG. 7, a method 700 for seamlessly providing alternative modes of consumption of media is shown. At 710, a request for media content is received. At 720, a user preferences database is queried for a mode of consumption preference for a user. In some embodiments, the user preferences database can be stored on various data storage devices as described above. At 730, a mode of consumption is determined based at least in part on the mode of consumption preference. In some embodiments a mode of consumption can be based, at least in part, on a user preference. In some embodiments a mode of consumption can be based on one or more other factors, individually or in combination, including cost, availability of storage, network type, speed, or reliability, and the like. At 740, a media content service is determined to provide the media content. Likewise, this determination can be made based on similar factors as described above.

At 750, if the mode of consumption is ownership, instructions to send a downloadable media content file are sent to a provisioning computer server of a media content service. At 760, if the mode of consumption is access, a set of one or more instructions to add a reference to a streamable media content file to a playlist database is sent to a content streaming service. It is to be understood that a media content file may be unavailable from any media content service for download. In some embodiments, the instruction can be sent at a later time and even at particular intervals, as described above, and to media content services that would provide the mode of consumption that is not preferred. That is, if the consumer preferred access, but the media were available only for download (i.e., ownership) then an instruction can be sent to download the media content file.

Any or all of 710-760 can be performed by an application such as application 410 and/or a central server such as content management server 140 as described above.

Figure 8:
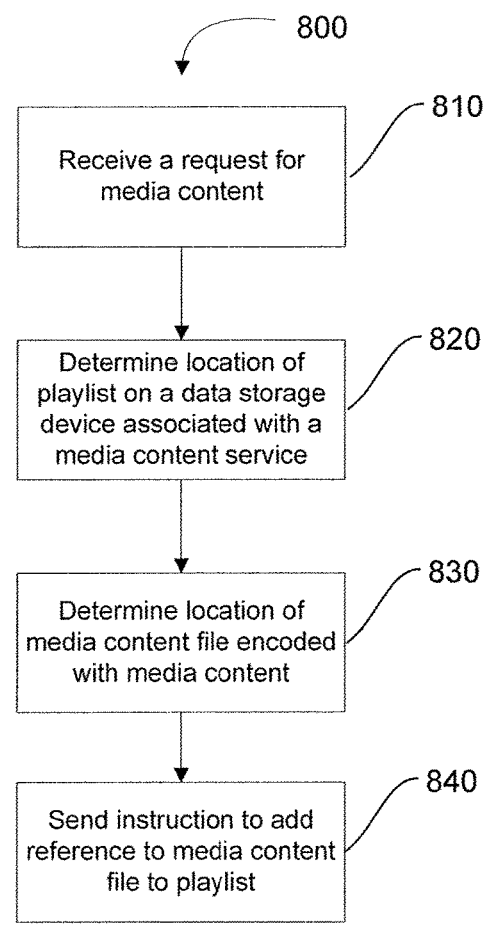
FIG. 8 illustrates a method for managing a playlist to provide agnostic consumption of media.

FIG. 8 shows a method 800 for managing a playlist to provide agnostic consumption of media. At 810, a request for media content is received. In some embodiments, the media content can be provided or made available in conjunction with method 800. At 820, the location of a playlist on a data storage device associated with a media content service can be determined. In some embodiments, such a playlist can also be associated with a consumer device by virtue of the consumer device storing a content streaming application. At 830, the location of the media content file encoded with the media content can be determined. In some embodiments, the media content file can be stored on a data storage device associated with a media content service other than the media content service with which the playlist data storage device is associated as described above. In other embodiments, the media content file can be on a data storage device associated with a consumer device or some other data storage device as described above.

At 840, an instruction is sent to add a reference to the media content file to the playlist. In some embodiments, if a preferred mode of consumption becomes available, the media content becomes available through a preferred media content service, or the media content file is moved, 840 can be repeated to update the playlist.

Some embodiments described herein relate to a computer storage product with a non transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

In conclusion, disclosed embodiments provide, among other things, a system and method for providing integrated playlists and seamless consumption of media. Those skilled in the art can readily recognize that numerous variations and substitutions may be made to the disclosed embodiments, their use and their configuration to achieve substantially the same results as achieved by the embodiments described herein. Accordingly, there is no intention to limit the disclosed embodiments or the claimed inventions to the disclosed exemplary forms. Many variations, modifications and alternative constructions fall within the scope and spirit of the inventions as expressed in the claims.

What is claimed is:

1. A method for integrating passive content discovery from directed broadcasts, including radio broadcasts, with request-based content delivery systems comprising:
    delivering, from a central computer server, a radio station broadcast to a first user of a web enabled device, the radio station broadcast including a plurality of media content, wherein the radio station broadcast is configured to allow an external operator to select a first media content from the plurality of media content via an administrator interface, the first media content is played by the web enabled device in real-time with the selection thereof;
    receiving, by the central computer server, a tag via a user interface of a client application in response to user input from the first user, wherein the first user is not the external operator, the tag associated with the first media content;
    receiving a mode of consumption preference for the user from at least one of:
        a) a user preferences database operatively coupled with the central computer server; or
        b) user input received through the client application associated with the central computer server;
    determining, based at least in part on the mode of consumption preference, a first access mode for the first media content, the first access mode including any of:
        a) streaming playlist; or
        b) downloading content to a user digital storage drive;
    determining, based at least in part on the mode of consumption preference, a mode of consumption path for the first media content, wherein the consumption path includes an external media content delivery service; and
    transmitting instructions, by the central computer server, to the determined consumption path to access the first media content according to the determined first access mode.

2. A system for integrating passive content discovery to users from directed broadcasts, including radio broadcasts, with request-based content delivery systems comprising:
    a central computer server configured to deliver a radio station broadcast to a first user of a web enabled device, the radio station broadcast including a plurality of media content, wherein the radio station broadcast is configured to enable an external operator to select a first media content from the plurality of media content via an administrator interface, wherein the first media content is played on the web enabled device in real-time with the selection thereof;
    a user preferences database communicatively coupled with the central computer server; and
    a client application operating on the web enabled device, and communicatively coupled with the central computer server and the user preferences database, the client application configured to receive tags from the first user via a user interface, wherein the first user is not the external operator, the tag associated with the first media content, the first media content included in the plurality of media content in the radio station broadcast;
    wherein the central computer server is configured to receiving a mode of consumption preference for the user from of the user preferences database or the client application and determine based at least in part on the mode of consumption preference:
        a first access mode for the media content, the first access mode including any of:
            a) streaming playlist; or
            b) downloading content to a user digital storage drive; and
        a mode of consumption path for the first media content, wherein the consumption path includes an external media content delivery service; and
    wherein the central computer further includes instructions to transmit instructions to the determined consumption path to access the first media content according to the determined first access mode.

3. A method for integrating passive content discovery from directed broadcasts, including radio broadcasts, with request-based content delivery systems comprising:
    delivering a radio station broadcast to a first user of a web enabled device, the radio station broadcast including a plurality of media content, wherein the radio station broadcast is configured to enable an external operator to select a first media content from the plurality of media content via an administrator interface, the first media content is played by the web enabled device in real-time with the selection thereof;
    receiving, by a central computer server, a tag from the first user via a user interface of a client application, wherein the first user is not the external operator, the tag associated with the first media content, the first media content included in the plurality of media content in the radio station broadcast;
    receiving a mode of consumption preference for the user from a user preferences database associated with the central computer server; or determining, based at least in part on the mode of consumption preference, an external media content delivery service; and transmitting instructions, by the central computer server, to the external media content delivery service to access a user library of the user and supplement the user library with the first media content.

4. The method of claim 1, wherein the determining the external media content delivery service of the consumption path includes sending a query to one or more computer servers of one or more media content services for availability data of the first media content.

5. The method of claim 1, further comprising:
transmitting, in response to the tag associated for the first media content, an
advertisement to the device from which the request was received.

6. The method of claim 1, wherein the external operator is a disc jockey or radio personality.

7. The method of claim 1, wherein the media content has a type selected from the group consisting of music, podcast, talk show, video, electronic book, and image.

8. The method of claim 1, wherein said access mode is streaming playlist, and said transmitting instructions comprising:
accessing a user account of the user on the external media content delivery service; and
supplementing a user playlist on the external media content delivery service with the first media content.

9. The method of claim 1 said access mode is downloading to the user digital storage drive, and said transmitting instructions comprises:
accessing a user account of the user on the external media content delivery service; and
triggering, by the central computer server, a download of the first media content from a first data storage device associated with the external media content delivery service to a second data storage device associated with the user.

10. The method of claim 1, further comprising:
transmitting, in response to the user input received through the client application associated with the central computer server, an advertisement to the device from which the request was received.

11. The system of claim 2, wherein the central computer server is further configured to send, in response to the client application receiving a tag associated with the first media content, an advertisement to the device from which the request was received.

12. The system of claim 2, wherein the central computer server is further configured to send, in response to the client application receiving a tag associated with the first media content includes data selected from the group consisting of media content metadata, RDS data, image data, QR code data, bar code data, and media content signature data.

13. The system of claim 2, wherein the media content has a type selected from the group consisting of music, video, electronic book, and image.

14. The system of claim 2, wherein the external operator is a disc jockey or radio personality.

15. The method of claim 3, wherein the determining the external media content delivery service of the consumption path includes sending a query to one or more computer servers of one or more media content services for availability data of the first media content.

16. The method of claim 3, wherein the media content has a type selected from the group consisting of music, podcast, talk show, video, electronic book, and image.

17. The method of claim 3, wherein the external operator is a disc jockey or radio personality.

18. The method of claim 3 said access mode is ownership, and said transmitting instructions comprises:
accessing a user account of the user on the external media content delivery service; and
triggering, by the central computer server, a download of the first media content from a first data storage device associated with the external media content delivery service to a second data storage device associated with the user.

19. The method of claim 8, said transmitting instructions further comprising:
triggering, by central computer server, a download of the first media content from a first data storage device associated with the external media content delivery service to a second data storage device associated with the user.

20. The method of claim 8, further comprising:
determining, based at least in part on the mode of consumption preference, a second access mode for the media content, the second access mode differing from the first access mode;
determining, a second consumption path according to the second access mode and availability data of the first media content; and
triggering, by the central computer server, a download of the first media content from a first data storage device via the second consumption path to a second data storage device associated with the user.

* * * * *